(12) United States Patent
Wilkinson et al.

(10) Patent No.: US 8,978,104 B1
(45) Date of Patent: Mar. 10, 2015

(54) ACCESS CONTROL CENTER WORKFLOW AND APPROVAL

(75) Inventors: Christopher Thomas Wilkinson, San Antonio, TX (US); Edward Allen Francovich, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 669 days.

(21) Appl. No.: 12/178,566

(22) Filed: Jul. 23, 2008

(51) Int. Cl.
*G06F 7/04* (2006.01)
*G06F 15/16* (2006.01)

(52) U.S. Cl.
USPC ............... 726/4; 726/1; 726/2; 726/3; 726/5; 726/11; 726/15; 726/27; 726/28; 726/29; 713/165; 713/182; 713/183; 709/217; 709/219; 709/223; 709/226; 709/229

(58) Field of Classification Search
USPC ....................................... 726/4; 709/217, 219
See application file for complete search history.

(56) References Cited

U.S. PATENT DOCUMENTS

| | | | |
|---|---|---|---|
| 5,968,176 A | 10/1999 | Nessett et al. | |
| 5,970,149 A | 10/1999 | Johnson et al. | |
| 6,205,579 B1 * | 3/2001 | Southgate | 717/173 |
| 6,230,287 B1 * | 5/2001 | Pinard et al. | 714/31 |
| 6,289,378 B1 * | 9/2001 | Meyer et al. | 709/223 |
| 6,356,934 B1 * | 3/2002 | Delph | 709/204 |
| 6,389,426 B1 | 5/2002 | Turnbull et al. | |
| 6,463,459 B1 | 10/2002 | Orr et al. | |
| 6,477,531 B1 * | 11/2002 | Sullivan et al. | 1/1 |
| 6,554,619 B2 | 4/2003 | Williams | |
| 6,611,822 B1 | 8/2003 | Beams et al. | |
| 6,754,707 B2 | 6/2004 | Richards et al. | |
| 6,799,213 B1 * | 9/2004 | Zhao et al. | 709/224 |
| 6,999,990 B1 | 2/2006 | Sullivan et al. | |
| 7,117,529 B1 | 10/2006 | O'Donnell et al. | |
| 7,159,237 B2 | 1/2007 | Schneier et al. | |
| 7,194,690 B2 | 3/2007 | Guillermo et al. | |
| 7,529,931 B2 | 5/2009 | Vasishth et al. | |
| 7,587,588 B2 | 9/2009 | Clemmons et al. | |
| 7,590,761 B2 * | 9/2009 | Raphael et al. | 709/249 |

(Continued)

OTHER PUBLICATIONS

Ishii et al, Integration of Interpersonal Space and Shared Workspace: ClearBoard Design and Experiments, ACM, vol. 11, No. 4, Oct. 1993, pp. 349-375.*

(Continued)

*Primary Examiner* — Christopher Brown
*Assistant Examiner* — Jenise Jackson
(74) *Attorney, Agent, or Firm* — Eric L. Sophir; Dentons US LLP

(57) ABSTRACT

Methods and systems are disclosed for providing indirect and temporary access to a company's IT infrastructure and business applications. The methods/systems involve establishing an access control center (ACC) to control the access that technical support personnel may have to the company's IT infrastructure and business applications. Thin client terminals with limited functionality may then be set up in the ACC for use by the technical support personnel. The thin client terminals connect the technical support personnel to workstations outside the ACC that operate as virtual desktops. The virtual desktops in turn connect the technical support personnel to the IT infrastructure and business applications. An ACC application may be used to control the connection between the thin client terminals and the virtual desktops and the virtual desktops and the IT infrastructure and business applications.

21 Claims, 8 Drawing Sheets

(56) References Cited

U.S. PATENT DOCUMENTS

| | | | |
|---|---|---|---|
| 7,630,914 B2 | 12/2009 | Veeningen et al. | |
| 7,702,409 B2 | 4/2010 | Lucas et al. | |
| 7,730,157 B2* | 6/2010 | Baratto et al. | 709/217 |
| 7,850,071 B2 | 12/2010 | Sakamoto et al. | |
| 7,865,959 B1 | 1/2011 | Lewis | |
| 7,984,483 B2 | 7/2011 | Leitz et al. | |
| 8,255,870 B2 | 8/2012 | Banino et al. | |
| 2002/0087882 A1 | 7/2002 | Schneier et al. | |
| 2002/0112186 A1* | 8/2002 | Ford et al. | 713/201 |
| 2003/0055804 A1 | 3/2003 | LaButte et al. | |
| 2004/0081951 A1 | 4/2004 | Vigue et al. | |
| 2004/0139075 A1 | 7/2004 | Brodersen et al. | |
| 2004/0181443 A1 | 9/2004 | Horton et al. | |
| 2005/0080897 A1* | 4/2005 | Braun et al. | 709/225 |
| 2005/0103491 A1 | 5/2005 | Newman et al. | |
| 2005/0125675 A1* | 6/2005 | Weseloh | 713/182 |
| 2006/0031476 A1 | 2/2006 | Mathes et al. | |
| 2006/0070077 A1* | 3/2006 | Erlandson et al. | 718/104 |
| 2006/0200477 A1 | 9/2006 | Barrenechea | |
| 2006/0265386 A1 | 11/2006 | Richter | |
| 2006/0293934 A1 | 12/2006 | Tsyganskiy et al. | |
| 2007/0061460 A1 | 3/2007 | Khan et al. | |
| 2007/0143837 A1* | 6/2007 | Azeez et al. | 726/11 |
| 2007/0150940 A1 | 6/2007 | Gilek et al. | |
| 2007/0162973 A1 | 7/2007 | Schneier et al. | |
| 2007/0174693 A1 | 7/2007 | Gerber | |
| 2007/0198656 A1 | 8/2007 | Mazzaferri et al. | |
| 2007/0250833 A1* | 10/2007 | Araujo et al. | 718/1 |
| 2007/0283012 A1* | 12/2007 | Chu et al. | 709/225 |
| 2008/0033882 A1 | 2/2008 | Kafkarkou et al. | |
| 2008/0086345 A1 | 4/2008 | Wilson et al. | |
| 2008/0098466 A1 | 4/2008 | Yoshida et al. | |
| 2008/0228692 A1 | 9/2008 | Wannemacher et al. | |
| 2008/0235361 A1* | 9/2008 | Crosbie et al. | 709/223 |
| 2008/0271020 A1 | 10/2008 | Leitz et al. | |
| 2009/0018890 A1 | 1/2009 | Werth et al. | |
| 2009/0019436 A1* | 1/2009 | Hartz et al. | 717/178 |
| 2009/0138510 A1* | 5/2009 | Childress et al. | 707/104.1 |
| 2009/0217177 A1* | 8/2009 | DeGrazia | 715/753 |
| 2009/0276771 A1 | 11/2009 | Nickolov et al. | |

OTHER PUBLICATIONS

Kibati et al, Wireless Local Loop in Developing Countries: Is It Too Soon for Data, MIT, 1999, pp. 1-116.*

Centrify. "Using PuTTY for Kerberos-Based Authentication to UNIX and Linux Systems." Centrify Corporation. [retrieved from the Internet on Jan. 10, 2008 using <URL: http://www.centrify.com/resources/putty.asp>].

Brown, M. "System Administration Toolkit: Set up remote access in UNIX through OpenSSH." IBM. [retrieved from the Internet on Jan. 10, 2008 using <URL: http://www.ibm.com/developerworks/aix/library/au-satopenssh.html>].

eGuard. "eGuard Technology Services." eGuard Tech—Services—Proactive Managed IT Support. [retrieved from the Internet on Jan. 10, 2008 using <URL: http://www.eguardtech.com/Computer%20Consulting%20Services.html>].

"Identify, understand and manage security information and events," IBM Corporation, Apr. 2007, pp. 1-6.

Yurcik, William, et al. "UCLog+ : A Seecurity Data Management System for Correlating Alerts, Incidents, and Raw Data From Remore Logs", University of Illinois at Urbana-Champaign, 10 pgs., date accessed Oct. 14, 2008.

* cited by examiner

ACCESS CONTROL CENTER WORKFLOW AND APPROVAL

CROSS-REFERENCE TO RELATED APPLICATIONS

This application is related to U.S. patent application Ser. No. 12/178,564, filed Jul. 23, 2008, entitled "ACCESS CONTROL CENTER WORKFLOW AND APPROVAL", now abandoned and U.S. patent application Ser. No. 12/178,569, filed Jul. 23, 2008, entitled "ACCESS CONTROL CENTER WORKFLOW AND APPROVAL", now abandoned, all of which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to computer and data security and, more specifically, to systems and methods for providing access to computers and data in a secure manner.

BACKGROUND

Companies often engage the services of third-party contractors to fill their IT (information technology) and technical support needs. This use of outside technical support personnel may be necessitated by a number of reasons, including restrictions on new hires within a company, a specific efficiency or technical expertise of the outside personnel, inconvenient or undesirable working hours (e.g., evening or holiday shifts), and the like.

To perform their services, however, the outside technical support personnel must have access to the company's IT infrastructure and business applications, including computer systems, networks, programs, and the like. Unfortunately, granting outside technical support personnel access to a company's IT infrastructure and business applications can create a number of risks, such as lost and/or stolen data, unauthorized access to critical and/or highly sensitive systems, and the like. Indeed, many of the same risks may exist to some degree even with the company's own internal technical support personnel.

Accordingly, what is needed is a way to minimize or eliminate the risks associated with allowing access to a company's IT infrastructure and business applications. More specifically, what is needed is a way to provide controlled or limited access to the company's IT infrastructure and business applications, and to provide such access on an as-needed basis.

SUMMARY

The disclosed embodiments are directed to methods and systems for providing controlled or limited access to a company's IT infrastructure and business applications on an as-needed basis. In one implementation, an access control center (ACC) may be established for restricting the access by technical support personnel to the company's IT infrastructure and business applications. Thin client terminals with limited functionality may then be set up in the ACC for use by the technical support personnel. The thin client terminals may be selectively connected to workstations outside the ACC that operate as virtual desktops. The virtual desktops may provide the technical support personnel with indirect and temporary access to the company's IT infrastructure and business applications. An ACC application may be used to control the connection between the thin client terminals and the virtual desktops and the virtual desktops and the IT infrastructure and business applications. Such an arrangement minimizes or eliminates the risks associated with allowing technical support personnel access to the company's IT infrastructure and business applications.

BRIEF DESCRIPTION OF THE DRAWINGS

The foregoing and other advantages of the disclosed embodiments will become apparent from the following detailed description and upon reference to the drawings, wherein.

DETAILED DESCRIPTION

Figure 1:
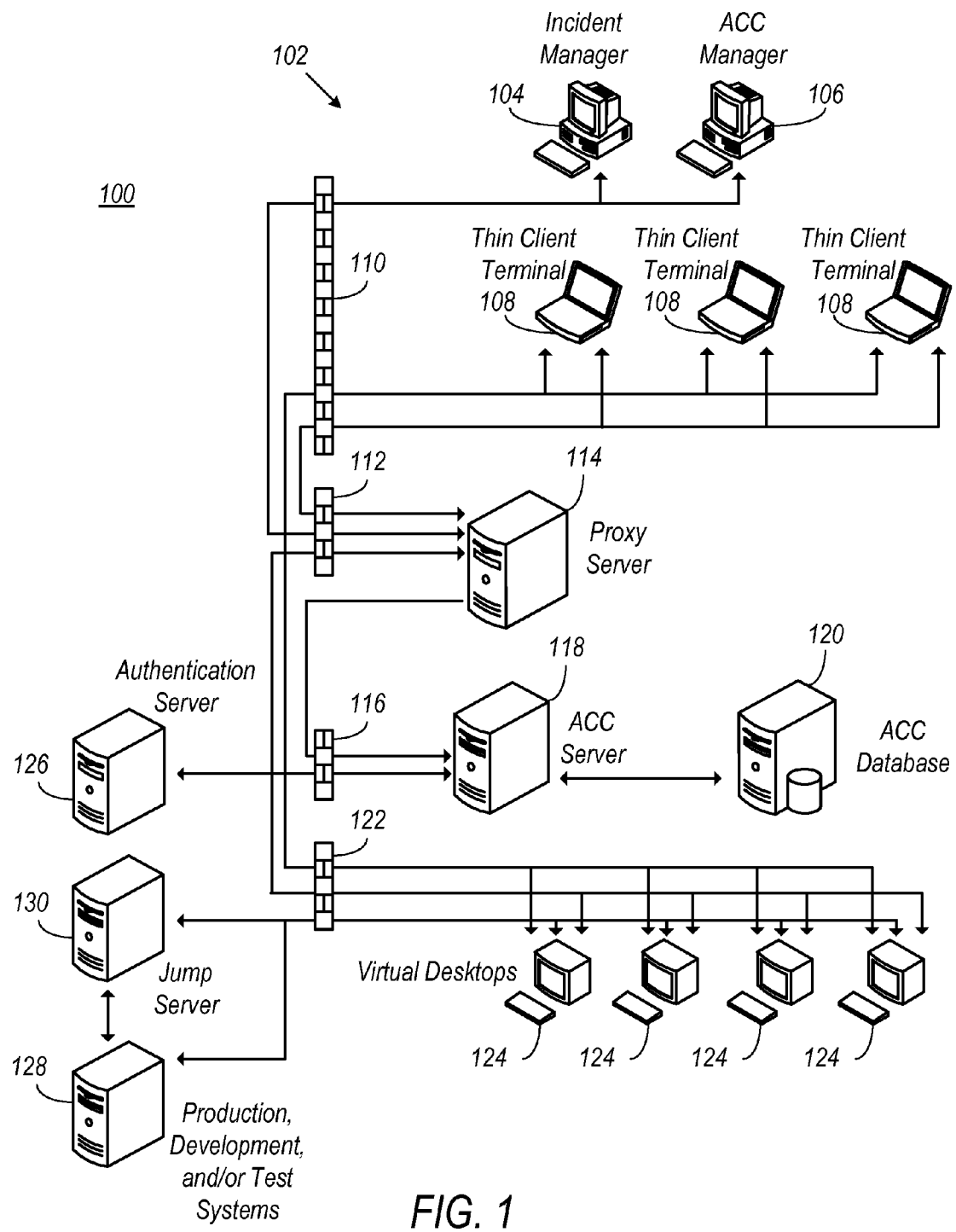
FIG. 1 illustrates an exemplary access control infrastructure including an access control center (ACC) for controlling access to a company's IT infrastructure and business applications according to the disclosed embodiments.

The drawings described above and the written description of specific structures and functions below are not presented to limit the scope of what has been invented or the scope of the appended claims. Rather, the drawings and written description are provided to teach any person skilled in the art to make and use the innovations for which patent protection is sought. Those skilled in the art will appreciate that not all features of a commercial embodiment of the innovations are described or shown for the sake of clarity and understanding.

Persons of skill in this art will also appreciate that the development of an actual commercial embodiment incorporating aspects of the innovations will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the innovation or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Turning now to FIG. 1, an exemplary infrastructure 100 is shown that is capable of being used to control access to a company's IT infrastructure and business applications, including computer systems, networks, and software programs. As alluded to above, it is often necessary for a company to provide access to such systems, networks, and programs to third-party technical support personnel. The infrastructure 100 may be used to limit or control this access by granting to the third-party technical support personnel only indirect and temporary access to the computer systems, networks, and software applications. Indeed, where applicable, the infrastructure 100 may also be used to limit access by the company's own internal technical support personnel. Accordingly, all third-party as well as internal company technical support personnel are henceforth referred to herein simply as "technical support personnel."

In some embodiments, the exemplary access control infrastructure 100 may include an area called an access control center (ACC) 102 from which access to the company's IT infrastructure and business applications may be controlled. Such an ACC 102 may be, for example, a secure room or other enclosed area within the company where the technical support personnel may enter in order to access to the company's IT infrastructure and business applications. Physical entry to the ACC 102 may then be restricted using available security measures, including badges, key cards, bio scans, and the like. However, such physical security measures may not be needed if the identities of the technical support personnel are verifiable in other ways, for example, through user IDs, passwords, access codes, and the like. These latter forms of verification are particularly useful where the ACC 102 is located at a remote or offsite location, for example, another city, state, or country, where it may be difficult for the company to implement and maintain control over physical security measures.

Within the ACC 102, a plurality of computing terminals may be provided, including one or more incident manager terminals 104, ACC manager terminals 106, and thin client terminals 108. The term "incident" is used herein to refer to any IT event or condition, unexpected or otherwise, that may adversely impact an important operation of the company and therefore requires immediate resolution by the technical support personnel. Such an incident typically includes major malfunctions, for example, a suddenly slow or unresponsive Web site, dropped network connections, loss of access to databases, and the like. However, an incident may also include minor operational glitches that, while not requiring immediate resolution, still need to be resolved at some point. Thus, as used herein, an "incident" may include any IT event or condition, whether major or minor, that requires the attention of the technical support personnel.

Referring first to the incident manager terminals 104, these terminals may be used by authorized individuals referred to herein as "incident managers" to manage the technical support personnel of the ACC 102. The incident managers generally are responsible for receiving notice of an incident, gathering any information needed about the incident, then assigning the appropriate technical support personnel to work on the incident. To this end, the incident manager terminals 104 may be general purpose computers with full functionality (e.g., hard drives, CD-ROM drives, etc.) and a full set of the software applications used in the company (e.g., e-mail, word processor, database tools, spreadsheet, Web browser, etc.). This allows the incident managers to perform their functions with maximum flexibility and functionality.

The ACC manager terminals 106, like the incident manager terminals 104, may also be general purpose computers that are fully functional and have a full complement of applications. These terminals 106 may be used by authorized individuals referred to herein as "ACC managers" to manage the remote access aspect of the ACC 102. In general, the ACC managers are responsible for granting the technical support personnel selected by the incident managers access to the company's IT infrastructure and business applications needed to resolve an incident. The ACC managers may selectively provide this access as needed based on the type of incident needing resolution, as will be further explained later herein.

As for the thin client terminals 108, these terminals may be used by the technical support personnel as remote desktops to perform the actual work needed to resolve an incident. Unlike the incident manager terminals 104 and the ACC manager terminals 106, the thin client terminals 108 may be dedicated computers that have mainly Web browsing and remote desktop functionality. Thus, functionality such as electronic messaging, Internet access, file transfer, copy/paste, and the like may be disabled on the thin client terminals 108 in some implementations. Such thin client terminals may be software-based thin clients, hardware-based thin clients, or a combination of both. Access to the company's IT infrastructure and business applications may then be provided through the thin client terminals 108 on a per-incident basis. In this way, the technical support personnel may still access the company's IT infrastructure and business applications, but with minimal risk to the security of the infrastructure and business applications.

An ACC firewall 110 may be provided to prevent unauthorized access to the incident manager terminals 104, ACC manager terminals 106, and thin client terminals 108 from outside the ACC 102. Another firewall 112, which may be a business-to-business (B2B) firewall, may be provided to prevent unauthorized access to a proxy server 114, which may be an extended mark-up language (XML) gateway server. An additional firewall 116, which may be an enclave firewall, may be provided to prevent unauthorized access to an ACC server 118 and an ACC database 120. Yet another firewall 122, which may be a third-party electronic community (EC) firewall, may be provided to prevent unauthorized access to a plurality of virtual desktops 124. These firewalls 110, 112, 116, and 122 may be implemented using standard firewall technology known to those having ordinary skill in the art and are therefore not discussed in detail here.

With respect to the proxy server 114, as the name implies, the proxy server 114 may operate as a proxy between the ACC server 118 and ACC database 120 and the ACC 102. The proxy server 114 may be located outside the ACC 102 and may offer the only path from the ACC 102 and the virtual desktops 124 through which the ACC server 118 and ACC database 120 may be accessed. This isolation helps prevent any unauthorized access to the ACC server 118 and ACC database 120, thus ensuring that the security and integrity of these systems are not easily compromised.

The security of the ACC server 118 and the ACC database 120 is particularly important considering their roles in controlling the access given to the technical support personnel. For example, when technical support personnel are assigned to incidents, the ACC server 118 may confirm the identities of the technical support personnel. The ACC server 118 may perform this confirmation, for example, by communicating with an authentication server 126, which may be any suitable authentication server (e.g., Microsoft Active Directory), to obtain verification of the identities of the technical support personnel. Similarly, when user IDs, passwords, or other credentials for the company's IT infrastructure and business applications are needed, the ACC server 118 may obtain these credentials from the ACC database 120. The ACC server 118 may also provide or otherwise cause these credentials to be provided directly to the IT infrastructure and business applications so that no intervention by the technical support personnel is needed. Therefore, in some implementations, the ACC server 118 and the ACC database 120 may be ensconced in a secure enclave and physical entry to the enclave may be restricted to help ensure their security.

In accordance with the disclosed embodiments, the above-mentioned access to the company's IT infrastructure and business applications may be provided through the virtual desktops 124. Such virtual desktops 124 may be implemented using any suitable computing systems that are capable of supporting one or more virtual terminals, for example, one or more Windows™, Unix™, or Linux™ workstations, servers, or other similar computing systems. These virtual desktops 124 may then be used to open remote access sessions to the company's IT infrastructure and business applications, depicted in FIG. 1 as one or more production, development, and/or test systems 128. Alternatively, or in addition, the virtual desktops 124 may connect to a jump server 130 that may in turn access to the production, development, and/or test systems 128.

As used herein, a production system is a system or application that has already been released and is fully operational and accessible by its intended users. A development system is a system or application that is currently undergoing development and design.

In some embodiments, the selection of which virtual desktops 124 to allow the technical support personnel to use may depend on the particular production, development, and/or test system 128 that needs service. The reason is because in some embodiments, certain virtual desktops 124 may be pre-assigned to certain production, development, and/or test systems 128 and may only have the software programs or tools for those production, development, and/or test systems 128. Such software programs or tools may include, for example, text editing tools, file management tools, software emulation tools, and other problem-solving/troubleshooting tools. The pre-assignment may be based on certain predefined service areas, for example, type of operating system (e.g., Windows, Unix, etc.), type of computing system (e.g., server, mainframe, etc.), type of software application (e.g., accounting, inventory, etc.), and the like. These pre-assignments help ensure that the virtual desktops 124 will have the necessary software programs or tools needed for their respective service areas. In other embodiments, however, all virtual desktops 124 may be loaded with the software programs and tools needed to work on all service areas. In still other embodiments, the required software programs or tools may be loaded on the virtual desktops 124 dynamically or on an as-needed basis. In the latter embodiments, predefined profiles may be used that specify specific software programs or tools to be loaded based on the particular service area of the incident.

Note that in the above arrangement, the technical support personnel may not be allowed to acquire or otherwise know the user IDs, passwords, and other credentials being used to access the production, development, and/or test systems 128. Instead, these user IDs, passwords, and other credentials may be obtained by the ACC server 118 from the ACC database 120 and sent in the background to the virtual desktops 124 where they are then passed to the production, development, and/or test systems 128. In other embodiments, however, the ACC server 118 may provide the user IDs, passwords, and other credentials to the technical support personnel (via the virtual desktops 124) who may then manually pass the credentials to the production, development, and/or test systems 128 being accessed.

In general operation, after being assigned to work on a given incident by an incident manager and approved to access a given virtual desktop 124 by an ACC manager, one of the technical support personnel may use his/her thin client terminal 108 to connect to the virtual desktop 124. From the virtual desktop 124, the technical support personnel may send a request to the ACC server 118 to access a particular production, development, and/or test system 128. Once this request is granted (by the ACC manager), a remote access session may be opened from the virtual desktop 124 to the production, development, and/or test system 128. The technical support person may then perform, through the thin client terminal 108 and the virtual desktop 124, various tasks needed on the production, development, and/or test system 128 to resolve the incident.

In some embodiments, instead of (or in addition to) connecting the technical support person to the actual production, development, and/or test system 128, the virtual desktop 124 may be configured to connect the technical support person to a jump server 130 that is in turn connected to the production, development, and/or test system 128. The jump server 130 may then operate as a proxy between the technical support person and the production, development, and/or test system 128 to prevent the technical support person from directly accessing the production, development, and/or test system 128. An example of such a jump server 130 may be a server running PowerBroker from Symark International, Inc.

Note in the foregoing that, while a single technical support person may be assigned to any given incident, it is also possible for multiple technical support personnel to be assigned to the same incident so that more than one technical support personnel may be given access to the same production, development, and/or test system 128 (albeit through different thin client terminals 108 and virtual desktops 124). In such an arrangement, a group of user IDs, passwords, and other credentials may be reserved or otherwise set aside for the production, development, and/or test system 128 to be used by the technical support personnel for that specific production, development, and/or test system 128. One or more databases may then be set up to record and track which user IDs and passwords are being used by which technical support personnel on which production, development, and/or test system 128 for which incidents and so forth.

Figure 2:
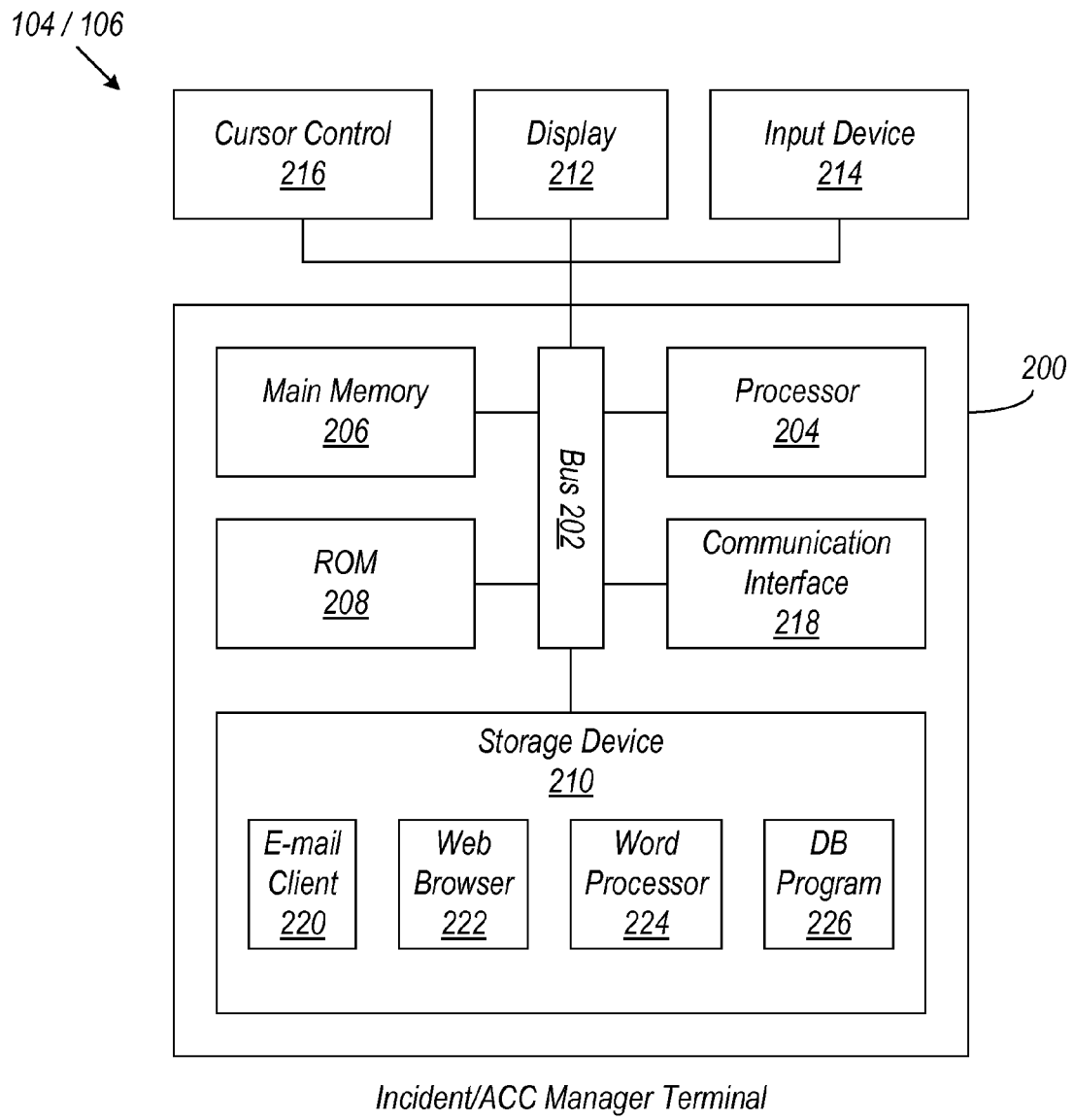
FIG. 2 illustrates an exemplary computer system that may be used as an incident manager terminal and/or ACC manager terminal according to the disclosed embodiments.

FIG. 2 illustrates an example of the incident manager terminal 104 and/or the ACC manager terminal 106 in more detail according to the disclosed embodiments. As can be seen, the incident manager terminal 104 and/or the ACC manager terminal 106 may be a general purpose computer system 200, such as a desktop computer, laptop computer, workstation, and the like. The computer system 200 typically includes a bus 202 or other communication mechanism for communicating information and a processor 204 coupled with the bus 202 for processing information. The computer system 200 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computer system 200 may further include a read-only memory (ROM) 208 or other static storage device coupled to the bus 202 for storing static information and instructions for the processor 204. A non-volatile computer-readable storage device 210, such as a magnetic, optical, or solid state device, may be coupled to the bus 202 for storing information and instructions for the processor 204.

The computer system 200 may be coupled via the bus 202 to a display 212, such as a cathode ray tube (CRT) or liquid crystal display (LCD), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non-volatile media, volatile media, and transmission media. Transmission media may include coaxial cables, copper wire and fiber optics, including wires of the bus 202. Transmission may take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The computer system 200 may also include a communication interface 218 coupled to the bus 202. The communication interface 218 typically provides a two way data communication coupling between the computer system 200 and the network 110. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

As mentioned above, the incident manager terminal 104 and/or the ACC manager terminal 106 may contain a full complement of applications commonly used in the company. These applications may be run from the storage device 210 of the computer system 200 and may include, for example, an e-mail client 220, a Web browser 222, a word processor 224, a database program 226, and the like. Other applications not expressly shown may include a spreadsheet program, a graphics program, and the like. The reason for providing a full complement of applications is to enable the incident and/or ACC managers to perform whatever tasks are needed, such as gathering information and communicating with others within the company, and also because the incident and/or ACC managers are typically authorized company employees and therefore present less of a security risk than the technical support personnel.

In some embodiments, however, rather than deploying a general purpose computer having a full complement of applications, it is also possible to use a computer having limited functionality and a reduced set of applications, similar to the thin client terminal 108. Any additional functionality and/or applications that may be needed by the incident and/or ACC managers may then be provided, for example, from a remotely located server. Such embodiments may be particularly useful, for example, where security for the ACC 102 may be difficult to maintain.

Figure 3:
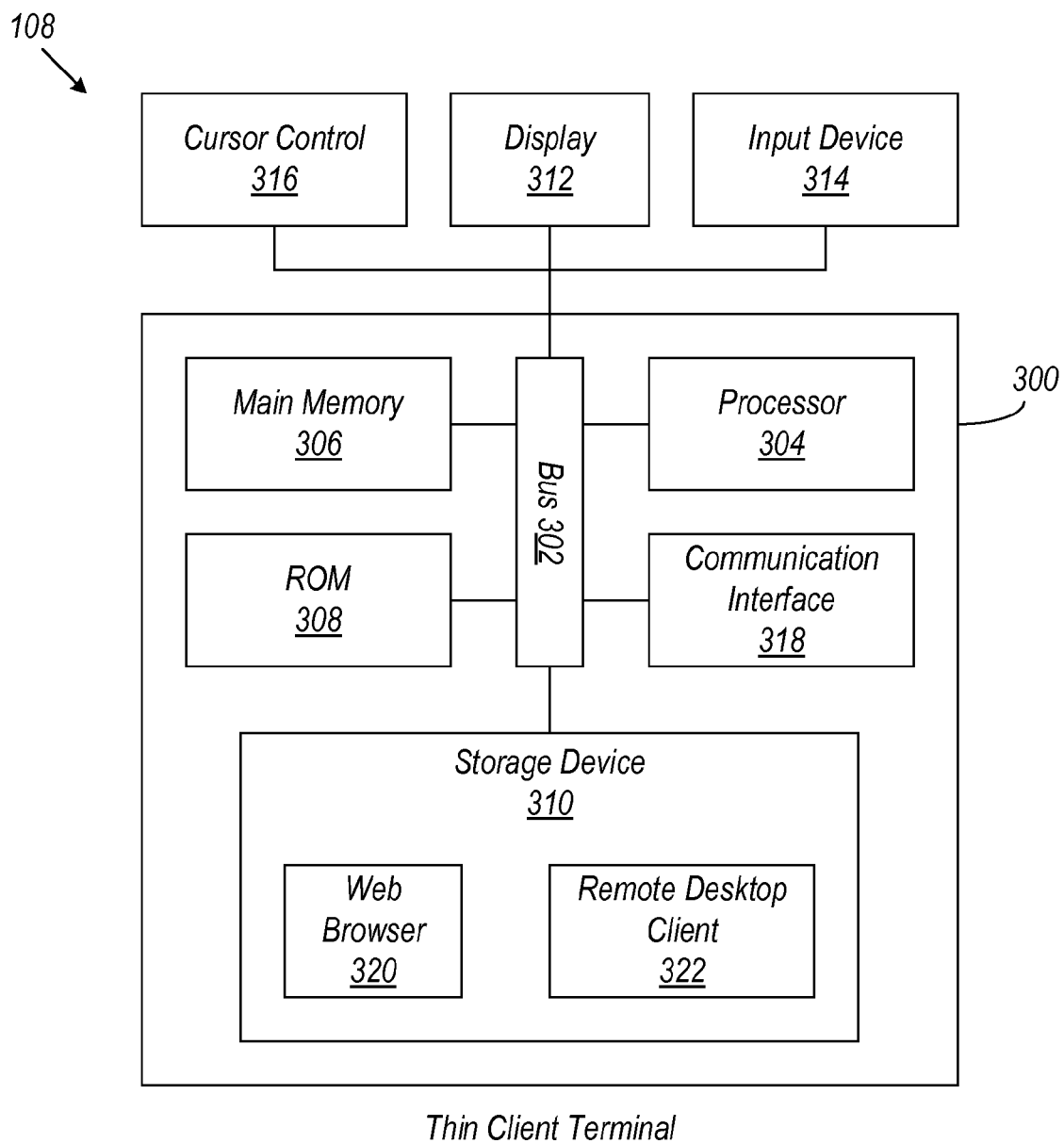
FIG. 3 illustrates an exemplary computer system that may be used as a thin client terminal according to the disclosed embodiments.

FIG. 3 illustrates an example of a thin client terminal 108 in more detail according to the disclosed embodiments. As explained above, each thin client terminal 108 may be a dedicated computer system 300 with reduced functionality that may be used to remotely access the virtual desktops 124. The dedicated computer system 300 may be a desktop computer, laptop computer, workstation, and the like, but is preferably a laptop computer, as these computers typically have their own battery and do not need a backup power supply. Such a dedicated computer system 300 may contain many of the same components as the general purpose computer system 200 of FIG. 2, including a bus 302, a processor 304, a main memory 306, a ROM 308, a storage device 310, a display 312, an input device 314, a cursor control 316, and a communication interface 318.

However, unlike the general purpose computer system 200, the dedicated computer system 300 may simply have a Web browser 320 and a remote desktop client 322 stored on its storage device 310. Where the operating system running on the dedicated computer system 300 is a Microsoft Windows operating system, the remote desktop client 322 may be the Remote Desktop Client built in to certain versions of the Windows operating system. Examples of such a dedicated computer system 300 may include Hewlett-Packard Company's Thin Clients, Wyse Technology's WinTerms, NeoWare, Inc.'s Appliances, and the like.

Figure 4:
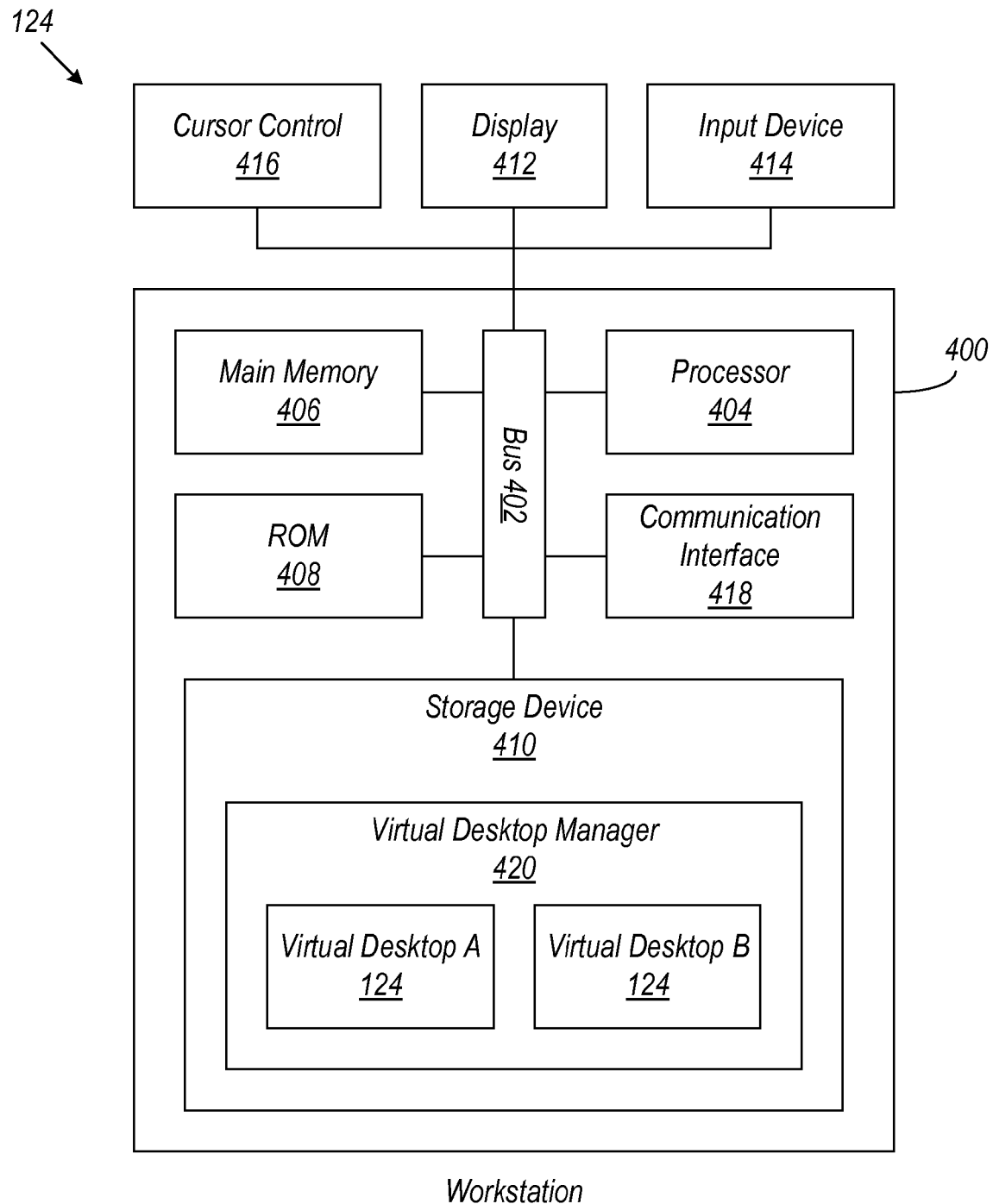
FIG. 4 illustrates an exemplary computer system that may be used as a virtual desktop according to the disclosed embodiments.

The thin client terminal 108 may then be used to remotely access one of the virtual desktops 124 (through the firewalls 110 and 122) according to the disclosed embodiments. An example of the virtual desktops 124 is shown in FIG. 4, where a workstation 400 or similar computing system may be used to implement one or several virtual desktops 124. The workstation 400 may contain many of the same components, or a locked down version thereof, as the general purpose computer system 200 of FIG. 2, such as a bus 402, a processor 404, a main memory 406, a ROM 408, a storage device 410, a display 412, an input device 414, a cursor control 416, and a communication interface 418.

In accordance with the disclosed embodiments, the workstation 400 may have installed thereon a virtual desktop manager 420 for providing one or more virtual desktops 124. The virtual desktop manager 420 may be any terminal service that is capable of supporting one or more of the virtual desktops 124, two of which are shown here as Virtual Desktops A and B, on the workstation 400. Examples of virtual desktop managers 420 that may be used may include Microsoft Windows Terminal Service, Virtual Desktop Infrastructure from VMware, Inc., and the like. In the present implementation, because the thin client terminals 108 are configured to use Windows' Remote Desktop Client (as opposed to some other remote access application) to access the virtual desktops 124, the virtual desktops 124 may be Windows-based virtual desktops. In alternative implementations, however, other virtual desktops 124 known to those having ordinary skill in the art may certainly be used without departing from the disclosed embodiments.

Figure 5:
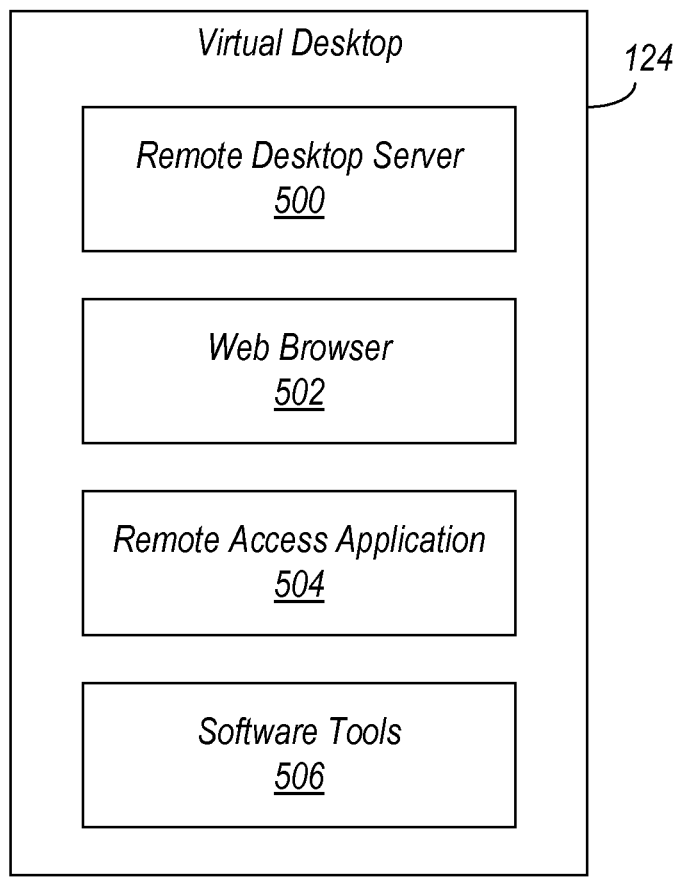
FIG. 5 illustrates the exemplary virtual desktop according to the disclosed embodiments in more detail.

FIG. 5 illustrates an example of one of the virtual desktops 124 in more detail according to the disclosed embodiments. As can be seen, the virtual desktop 124 may provide a number of applications, including a remote desktop server 500, a Web browser 502, a remote access application 504, and one or more software programs or tools 506 for resolving/troubleshooting incidents. Note that each technical support person may be allowed to access one virtual desktop 124 at a time and typically stays on the same virtual desktop 124 until he/she has resolved the incidents that have been assigned to him/her (or until his/her shift is over).

In general, the remote desktop server 500 may function to establish a remote desktop session with the remote desktop client 322 (see FIG. 3) of the thin client terminals 108. Such a remote desktop server 500 may be the Remote Desktop Server available in certain versions of Windows where, as here, the remote desktop client 322 being used is the Remote Desktop Client available in certain versions of Windows. Of course, other remote desktop servers 500 may be used with other operating systems without departing from the scope of the disclosed embodiments.

As for the Web browser 502, any suitable Web browser may be used, such as Internet Explorer, Mozilla, Netscape, and the like. Such a Web browser may then be used by the technical support personnel to access the ACC server 118 from the virtual desktop 124.

The remote access application 504 may similarly be any suitable remote access application 504 that is capable of opening a remote access session with either the production, development, and/or test systems 128, or the jump server 130. Examples of remote access applications 504 that may be used include PuTTY for Unix-based systems, Remote Desktop for Windows-based systems, PCOMM for IBM mainframes, and the like.

Finally, the software programs or tools 506 may be any suitable software tools commonly used by those having ordinary skill in the art for resolving/troubleshooting incidents, such as text editing tools, file management tools, software emulation tools, and the like.

Although not expressly shown, in some embodiments, one or more ACC databases may also be provided on the ACC server 118 to record and track the technical support personnel's access to the production, development, and/or test system 128. Examples of information that may be tracked include which technical support personnel are using which virtual desktop 124 to access which production, development, and/or test system 128 to resolve which incident using which user IDs and passwords, and the time, date and duration that the technical support personnel accessed the production, development, and/or test system 128, and the like.

Figure 6:
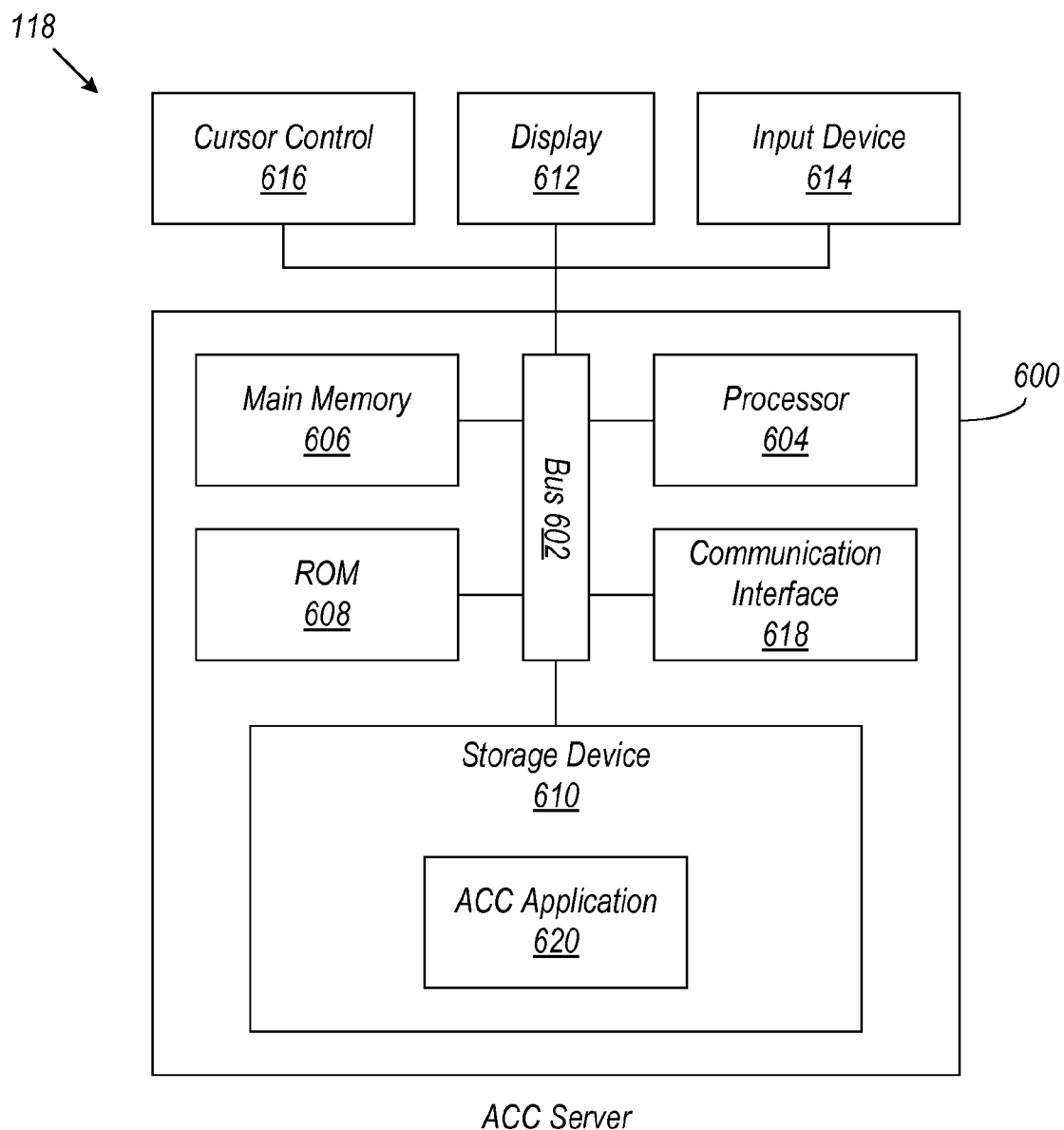
FIG. 6 illustrates an exemplary computer system that may be used as an ACC server according to the disclosed embodiments.

Turning now to FIG. 6, an example of the ACC server 118 is shown according to the disclosed embodiments. The ACC server 118, as the name suggests, may be a server computer 600, or it may also be a workstation, personal computer, and the like. The server computer 600 may contain many of the same components as the general purpose computer system 200 of FIG. 2, for example, a bus 602, a processor 604, a main memory 606, a ROM 608, a storage device 610, a display 612, an input device 614, a cursor control 616, and a communication interface 618. Such an ACC server 118 may then be used to provide indirect and temporary access to the production, development, and/or test systems 128 of the company. To this end, an ACC application 620 may be present on the ACC server 118 to help control or limit access to the production, development, and/or test systems 128 of the company.

Figure 7:
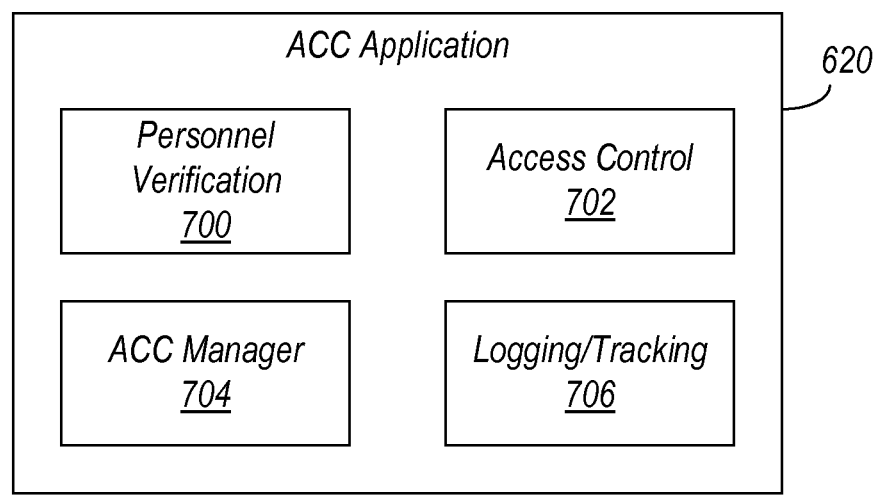
FIG. 7 illustrates an exemplary ACC application according to the disclosed embodiments.

FIG. 7 illustrates the ACC application 620 according to the disclosed embodiments in more detail. In some embodiments, the ACC application 620 may be a Web-based application that has a plurality of Web pages, each page providing a different set of functions and options. Users, including incident managers, ACC managers, and technical support personnel may then access certain pages of the ACC application 620 by entering the URL (uniform resource locator) of the ACC application 620 into a standard Web browser, such as Internet Explorer, Mozilla, Netscape, and the like. As can be seen, the ACC application 620 may be composed of a number of functional components, including a personnel verification module 700, an access control module 702, a credentials manager 704, and a logging/tracking module 706. Following is a description of the functionality of each component.

The personnel verification module 700 may operate to verify the identity of the users who access the ACC application 620. For example, after technical support personnel enter the URL (uniform resource locator) of the ACC application 620, they may be required to provide their user IDs and passwords in order to access the ACC application 620. Upon receiving a user ID and password, the personnel verification module 700 may connect to the authentication server 126 (see FIG. 1) of the company and verify that the user ID and password are valid. If they are verified, then the technical support personnel will be allowed to proceed further. Verification of the user ID and password may be performed using any technique known to those having ordinary skill in the art without departing from the scope of the disclosed embodiments. Examples of software tools that may be used to verify user IDs and passwords are available from Quest Software, Inc.

The access control module 702 may operate to control access to the virtual desktops 124 and the production, development, and/or test systems 128 for the ACC application 620. In the present implementation, the technical support personnel are not allowed on their own to directly access any of the virtual desktops 124 or the production, development, and/or test systems 128 from their thin client terminals 108. They must access the virtual desktops 124 and the production, development, and/or test systems 128 from the ACC application 620, for example, through a hyperlink, pointer, or similar navigation mechanism provided by the ACC application 620.

In accordance with the disclosed embodiments, the access control module 702 may provide (or may cause to be provided) the navigation mechanism to the technical support personnel. The access control module 702 may provide the navigation mechanism to the technical support personnel upon receiving expressed approval from an ACC manager. Moreover, the access control module 702 may require separate approval for both the virtual desktops 124 and the production, development, and/or test systems 128 (i.e., two or more different approvals). In some embodiments, the access control module 702 may also allow (or require) the ACC manager (or the incident manager) to specify the particular virtual desktops 124 to be used by the technical support personnel.

Once the ACC manager has provided approval for the technical support personnel to connect to the virtual desktops 124 and subsequently to the production, development, and/or test systems 128, the credentials manager 704 may operate to retrieve any user IDs, passwords, and other credentials needed to access the production, development, and/or test systems 128. The credentials manager 704 may perform this function by connecting to the ACC database 120 (see FIG. 1) and looking up the credentials for the production, development, and/or test systems 128 to be accessed by the technical support personnel.

In some embodiments, the credentials manager 704 may thereafter provide the retrieved credentials directly to the production, development, and/or test systems 128 (through the virtual desktops 124), thereby accessing the production, development, and/or test systems 128 in an automated manner. Such an arrangement has an advantage in that the technical support personnel are not exposed to the credentials and therefore cannot misuse them. In other embodiments, however, the credentials manager 704 may provide the credentials in text form to the technical support personnel to be used to manually access the production, development, and/or test systems 128. In other embodiments, however, instead of the credentials manager 704 automatically providing the credentials directly to the production, development, and/or test systems 128 (i.e., auto logon), the technical support personnel may be allowed to manually log on to the production, development, and/or test systems 128 (and/or the virtual desktops 124).

Finally, the logging/tracking module 706 operates to record the activities of the technical support personnel on the thin client terminals 108, the virtual desktops 124, and the production, development, and/or test systems 128. In some embodiments, the recording may be a full session capture of all activities carried out by the technical support personnel (e.g., keystroke logging, etc.). In other embodiments, however, the logging/tracking module 706 may provide a more limited record, for example, just the activities related to the request for access (e.g., who made the request, who authorized it, to which system, etc.). The logs may be subsequently reviewed by company management to determine if any changes are needed in procedures, technical support personnel, infrastructure, and the like.

The personnel verification module 700, the access control module 702, the credentials manager 704, and the logging/tracking module 706 may store and retrieve any data used by these various functional components in the ACC database 120. Such a database 120 may be any structured collection of records known to those having ordinary skill in the art, and it may be accessed by the functional components 702, 704, 706, and 708 either in real time as needed, or according to some predefined schedule. The data stored in the ACC database 120 may generally be all data or information used by the functional components 702, 704, 706, and 708 to carry out their various functions. Such data or information may include data or information on each incident, technical support person, incident manager, ACC manager, organizational unit, service area, virtual desktop, thin client terminal, access credentials, approval given, approval revocation, and the like.

Figure 8:
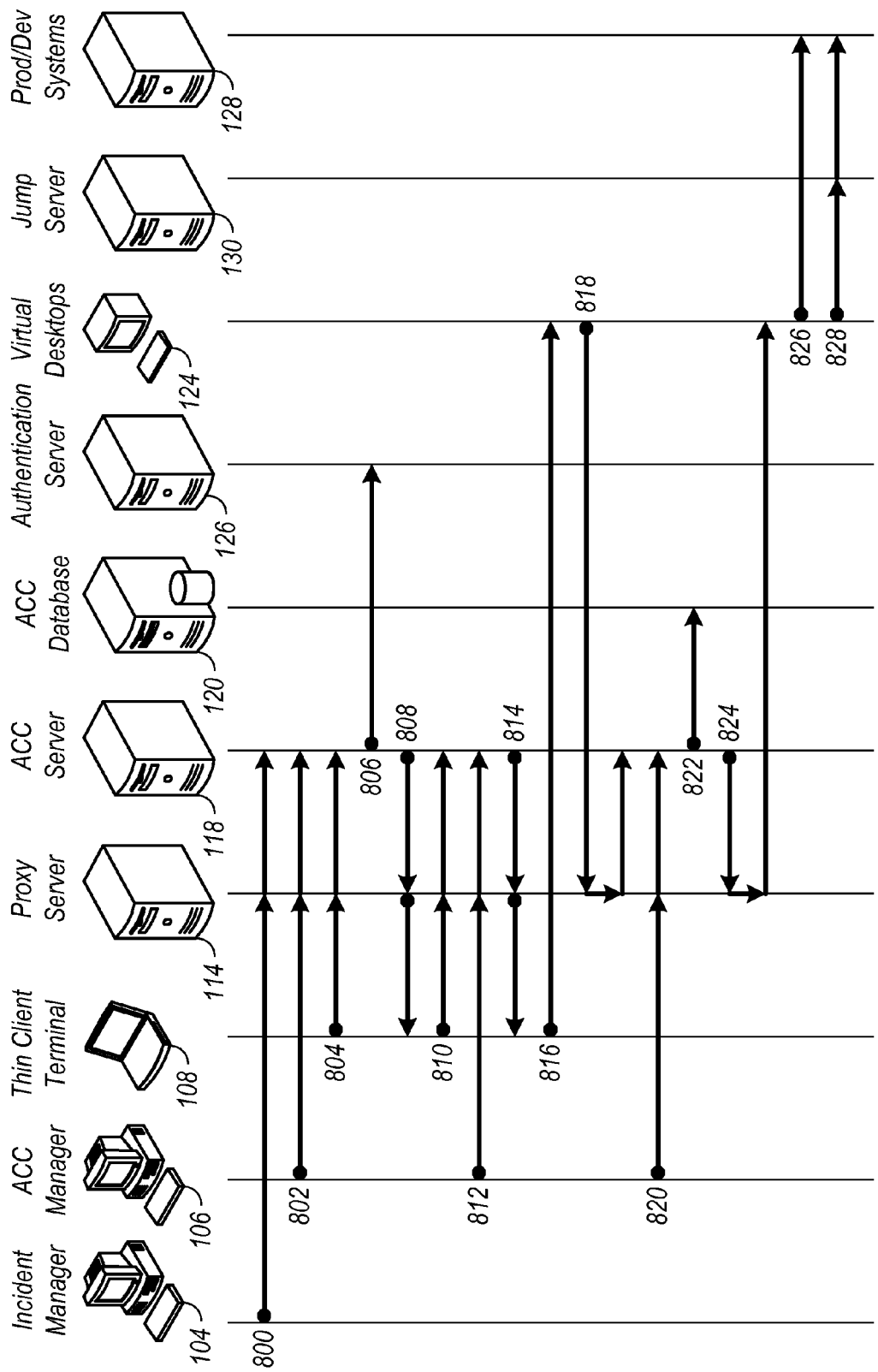
FIG. 8 illustrates an exemplary sequence diagram showing operation of the access control infrastructure according to the disclosed embodiments.

FIG. 8 illustrates an exemplary sequence diagram showing the operation of the embodiments disclosed above in more detail. By way of example and also for ease of understanding, it will be assumed that the thin client terminals 108 and virtual desktops 124 in FIG. 8 are Windows-based and the Web browser thereon is the Internet Explorer Web browser. Note also that while the exemplary diagram in FIG. 8 combines several related events into one or more series of events, those having ordinary skill in the art will understand that different combinations of events resulting in different series of events from those shown in FIG. 8 may certainly be used without departing from the scope of the disclosed embodiments. Also, although they are present, the various firewalls 110, 112, 116, and 122 discussed above with respect to FIG. 1 have been omitted from FIG. 8 for readability and economy of the description.

In FIG. 8, operation may begin when an incident is reported to the ACC 102. Various channels may be used to report an incident to the ACC 102, such as by e-mail message, telephone call, intra-company memo, auto-generated alert, in-person communication, and the like.

An incident manager, after entering the ACC 102, logging in to an incident manager terminal 104 (e.g., by providing his/her user ID and password), and receiving notice of the incident, may access the ACC server 118 through the proxy server 114 to enter or otherwise create a record of the incident on the ACC server 118, indicated at 800. The incident record may contain various information about the incident, including a description of the incident, the network address of the production, development, and/or test system 128 affected, the service area (e.g., operating system, software application, etc.) involved, and so forth. At this time, the incident manager may also assign one or more technical support personnel from a pool of technical support personnel to work on the incident. The specific technical support personnel that the incident manager may assign to the incident may depend on the service area of the incident and the particular experience and expertise of the technical support personnel.

At 802, an ACC manager, after entering the ACC 102, logging in to an ACC manager terminal 106 (e.g., by providing his/her user ID and password), accessing the ACC server 118 through the proxy server 114, and seeing the record of the incident, may assign the incident to one of the virtual desktops 124. As with the assignment of the technical support personnel, the specific virtual desktop 124 that the ACC manager may assign to the incident may depend on the service area of the incident and whether the particular software programs or tools needed to resolve the incident are available on the virtual desktop 124.

At 804, a technical support person, after entering the ACC 102, may log onto the ACC server 118 through the proxy server 114 from one of the thin client terminals 108 and provide his/her user ID and password. At 806, the ACC server 118 may receive the user ID and password and may communicate with the authentication server 126 to verify the user ID and password of the technical support person. Assuming the user ID and password are verified, the ACC server 118 may then send information to the technical support person's thin client terminal 108 concerning the incident (or several incidents) to which the technical support person has been assigned along with the particular virtual desktop 124 designated by the ACC manager for use with that incident, indicated at 808. The technical support person may thereafter submit a request to the ACC server 118 from his/her thin client terminal 108 to access the designated virtual desktop 124, indicated at 810.

At 812, the ACC manager, upon seeing that a request to access a virtual desktop 124 has been submitted to the ACC server 118 from the technical support person, may send approval for the access request to the ACC server 118. Once the ACC server 118 has received approval for the access request from the ACC manager (via the ACC manager terminal 106), it may send a reference for the designated virtual desktop 124, such as a hyperlink, destination name, or similar navigation mechanism to the thin client terminal 108 of the technical support person, indicated at 814. The technical support person may then use the hyperlink, destination name, or similar navigation mechanism to open a remote desktop session with the designated virtual desktop 124, indicated at 816.

After the remote desktop session is established, the technical support person may again access the ACC server 118, but this time from the virtual desktop 124 (via the proxy server 114), indicated at 818. If necessary, the technical support person may provide his/her user ID and password once more to the ACC server 118. It is also possible in some embodiments for the ACC server 118 to skip the verification step (i.e., no user ID or password needed) by virtue of the technical support person accessing the ACC server 118 from a trusted source, namely the designated virtual desktop 124. The technical support person may then retrieve information from the ACC server 118 concerning the incident for which he/she has been assigned, such as the production, development, and/or test system 128 involved in the incident, the status of the incident, and the like. If there are multiple incidents assigned to the technical support person, then information pertaining to all of the incidents may be retrieved at this time.

After receiving the incident information, the technical support person may send to the ACC server 118 a request to access the production, develop, and/or test system 128 for the incident to which he/she has been assigned along with a reference for the incident (e.g., incident ticket number). At 820, the ACC manager, upon seeing that a request to access a production, development, and/or test system 128 has been submitted to the ACC server 118 from the technical support person, may send approval for the access request to the ACC server 118. The ACC manager may also select one of several pre-assigned user IDs, if any, to be used with the production, development, and/or test system 128 at this time.

After the ACC server 118 receives the approval for the access request and any associated user IDs from the ACC manager (via the ACC manager terminal 106), it may retrieve any credentials (e.g., passwords, etc.) for the approved production, development, and/or test system 128 from the ACC database 120, indicated at 822. The ACC server 118 may thereafter send the credentials to the virtual desktop 124 of the technical support person along with a reference for the production, development, and/or test system 128, such as a hyperlink, destination name, or similar navigation mechanism, indicated at 824.

In some embodiments, the virtual desktop 124 may be configured so that upon receiving the credentials and the reference for the production, development, and/or test system 128, the virtual desktop 124 automatically launches its remote access application 504 (see FIG. 5), such as PuTTY, Remote Desktop, PCOMM, and the like, to establish a connection with the production, development, and/or test system 128, indicated at 826. The virtual desktop 124 may also automatically pass any credentials to the production, development, and/or test system 128 at this time. The technical support person may then use the virtual desktop 124 to access the production, development, and/or test system 128 to work on the incident. In other embodiments, however, it is possible for the virtual desktop 124 to present either or both the reference and the credentials or the production, development, and/or test system 128 received from the ACC server 118 in text form to the technical support person. The technical support person may then use this information to manually launch the remote access application 604, established a connection with the production, development, and/or test system 128, and enter any credentials needed thereby.

In still other embodiments, instead of establishing a connection from the virtual desktop 124 to the production, development, and/or test system 128, a connection may be established from the virtual desktop 124 to the jump server 130 (see FIG. 1). The jump server 130, as understood by those having ordinary skill in the art, functions as a proxy that provides another layer of security between the technical support person and the production, development, and/or test system 128. The technical support person may thereafter access the production, development, and/or test system 128 through the jump server 130, indicated at 828.

Once the technical support person has resolved the incident, he/she may close the connection with the production, development, and/or test system 128. The ACC manager may thereafter revoke approval for any access given to the technical support person on the ACC server 118 at this time (or at anytime throughout the process) to prevent its further usage. Similarly, the ACC manager may cause the user ID being used for the production, development, and/or test system 128 to be revoked at this time (or at anytime throughout the process) to prevent its further usage.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for restricting access provided to technical support personnel to computing devices of a company's computing network, the system comprising a processor and memory in a computing apparatus configured to:
   verify an identification of a technical support person based on a user identifier and password associated with the technical support person;
   provide a navigation mechanism to a computing terminal operated by the technical support person upon receiving access approval from a remote computing terminal and at least one of a production, development, and test system pre-assigned to the remote computing terminal, wherein the received access approval is selectively provided based on a type of incident needing resolution;

allow the computing terminal operated by the technical support person to connect to the remote computing terminal upon activation of the navigation mechanism, the remote computing terminal having pre-assigned a service area of the at least one of the production, development, and test system and being physically and logically isolated from the computing terminal operated by the technical support person and having limited functionality, wherein a firewall logically isolates a first network comprising the remote computing terminal from one or more networks comprising the at least one of the production, development, and test system, wherein the remote computing terminal is pre-assigned the service based on one or more software tools loaded on the remote computing terminal;

establish a remote access session between the remote computing terminal and the at least one of the production, development, and test system;

allow the technical support person to access the at least one of the production, development, and test system only from the remote computing terminal;

track and record a number of activities performed by the technical support person while the technical support person has access to the at least one of the production, development, and test system; and recording the user identifier and the password that was used by the technical support person while performing each of the number of activities.

2. The system of claim 1, wherein the processor and memory are further configured to access a company authentication server to verify the identification of the technical support person.

3. The system of claim 1, wherein the processor and memory are further configured to obtain one or more credentials for the at least one of the production, development, and test system from a centralized credentials database.

4. The system of claim 1, wherein the processor and memory are further configured to communicate with the technical support person through a gateway server.

5. The system of claim 1, wherein the processor and memory are further configured to communicate with the technical support person through at least one firewall.

6. The system of claim 1, wherein the remote computing terminal is a virtual desktop, one or more virtual desktops being provided by a workstation.

7. The system of claim 1, wherein the computing terminal operated by the technical support person is a thin client terminal, and wherein the technical support person connects to the remote computing terminal using the thin client terminal, and wherein the thin client terminal is local to the technical support person.

8. A method of restricting access provided to technical support personnel to a company's computing devices, the method comprising:

verifying an identification of a technical support person using a user identifier and a password associated with the technical support person;

providing a navigation mechanism to a computing terminal operated by the technical support person upon receiving access approval from a remote computing terminal and at least one of a production, development, and test system pre-assigned to the remote computing terminal;

wherein the received access approval is selectively provided based on a type of incident needing resolution;

allowing the computing terminal operated by the technical support person to connect to the remote computing terminal via the navigation mechanism, the remote computing terminal having pre-assigned a service area of the at least one of the production, development, and test system and being physically and logically isolated from the computing terminal operated by the technical support person and having limited functionality, wherein a firewall logically isolates a first network comprising the remote computing terminal from one or more networks comprising the at least one of the production, development, and test system, wherein the remote computing terminal is pre-assigned the service area based on one or more software tools loaded on the remote computing terminal;

establishing a remote access session between the remote computing terminal and the company's computing system;

allowing the technical support person to access the at least one of the production, development, and test system only from the remote computing terminal;

tracking and recording a number of activities performed by the technical support person while the technical support person has access to the at least one of the production, development, and test system; and recording the user identifier and the password that was used by the technical support person while performing each of the number of activities.

9. The method of claim 8, further comprising accessing a company authentication server to verify the identification of the technical support person.

10. The method of claim 8, further comprising obtaining one or more credentials for the at least one of the production, development, and test system from a centralized credentials database.

11. The method of claim 8, further comprising communicating with the technical support person through a gateway server.

12. The method of claim 8, further comprising communicating with the technical support person through at least one firewall.

13. The method of claim 8, wherein the remote computing terminal is a virtual desktop, one or more virtual desktops being provided by a workstation.

14. The method of claim 8, wherein the technical support person connect to the remote computing terminal using a thin client terminal that is local to the technical support person.

15. A non-transitory computer-readable medium encoded with computer-readable instructions for restricting access provided to technical support personnel to a company's computing devices, the computer-readable instructions comprising instructions for causing a computer to:

verify an identification of a technical support person based on a user identifier and password associated with the technical support person;

provide a navigation mechanism to a computing terminal operated by the technical support person upon receiving access approval from a remote computing terminal and at least one of a production, development, and test system pre-assigned to the remote computing terminal, wherein the received access approval is selectively provided based on a type of incident needing resolution;

allow the computing terminal operated by the technical support person to connect to the remote computing terminal via the navigation mechanism, the remote computing terminal having pre-assigned a service area of the at least one of the production, development, and test system and being physically and logically isolated from the computing terminal operated by the technical support person and having limited functionality, wherein a firewall logically isolates a first network comprising the remote computing terminal from one or more networks comprising the at least one of the production, development, and test system, wherein the remote computing terminal is pre-assigned the service based on one or more software tools loaded on the remote computing terminal;

establish a remote access session between the remote computing terminal and the at least one of the production, development, and test system;

allow the technical support person to access the at least one of the production, development, and test system only from the remote computing terminal;

track and record a number of activities performed by the technical support person while the technical support person has access to the at least one of the production, development, and test system; and recording the user identifier and the password that was used by the technical support person while performing each of the number of activities.

16. The non-transitory computer-readable medium of claim 15, further comprising instructions for causing a computer to access a company authentication server to verify the identification of the technical support person.

17. The non-transitory computer-readable medium of claim 15, further comprising instructions for causing a computer to obtain one or more credentials for the system at least one of the production, development, and test from a centralized credentials database.

18. The non-transitory computer-readable medium of claim 15, further comprising instructions for causing a computer to communicate with the technical support person through a gateway server.

19. The non-transitory computer-readable medium of claim 15, further comprising instructions for causing a computer to communicate with the technical support person through at least one firewall.

20. The non-transitory computer-readable medium of claim 15, wherein the remote computing terminal is a virtual desktop, one or more virtual desktops being provided by a workstation.

21. The non-transitory computer-readable medium of claim 15, wherein the technical support person connect to the remote computing terminal using a thin client terminal that is local to the technical support person.

* * * * *